R. J. COLVIN.
Grain-Drill.
No. 62,818.
Patented Mar 12, 1867.
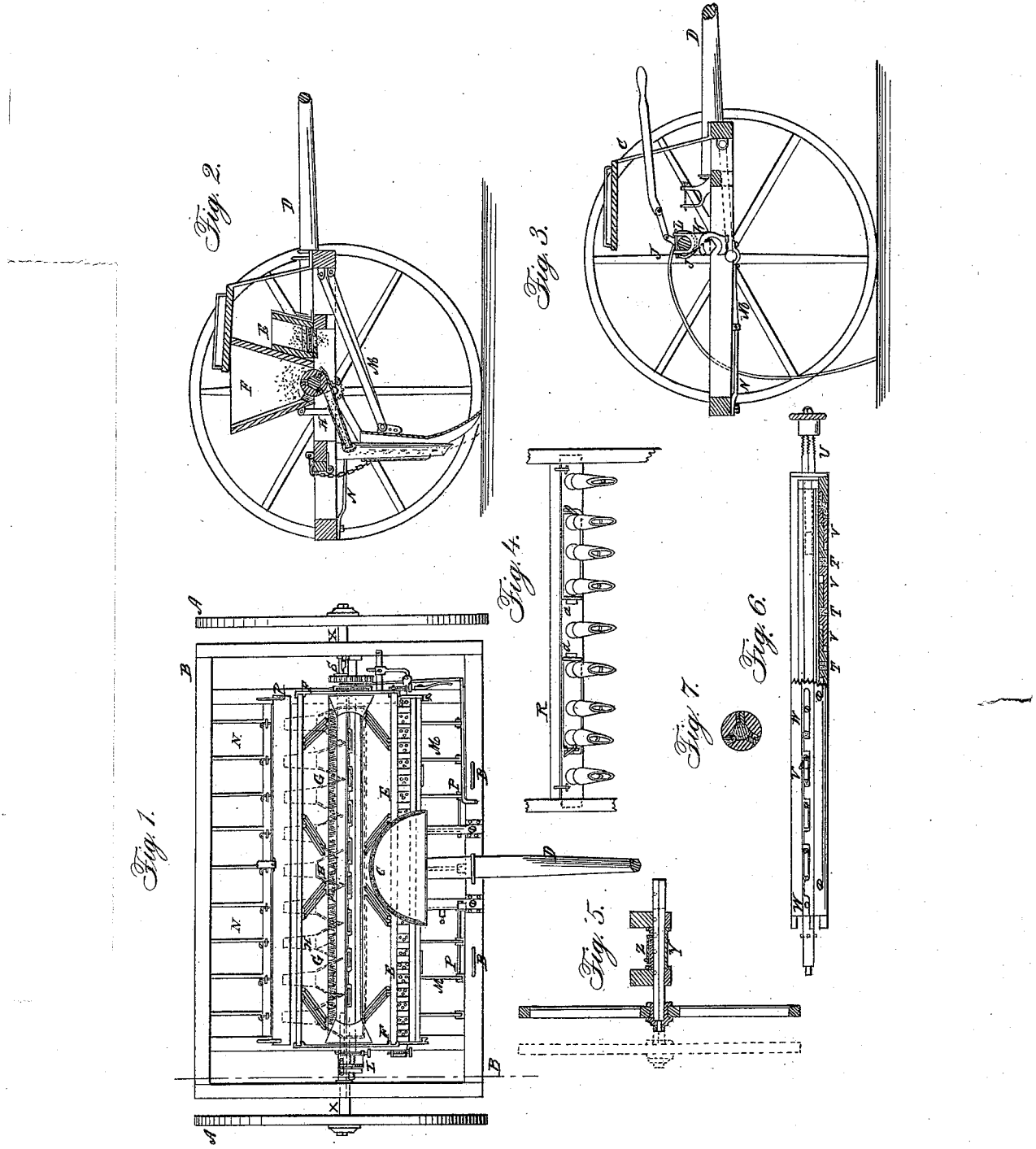
Witnesses:
Levy Dellenbey
L. Liechs
Inventor:
J. Franklin Reigart
Atty for Robert J. Colvin
AM. PHOTO-LITHO. CO. N.Y. (OSBORNE'S PROCESS.)

United States Patent Office.

ROBERT J. COLVIN, OF LANCASTER, PENNSYLVANIA.

Letters Patent No. 62,818, dated March 12, 1867.

IMPROVEMENT IN COMBINED RAKE AND SEEDER.

*The Schedule referred to in these Letters Patent and making part of the same.*

TO ALL WHOM IT MAY CONCERN:

Be it known that I, ROBERT J. COLVIN, of the city of Lancaster, county of Lancaster, and State of Pennsylvania, have invented a new and useful Adjustable Seeding-Machine, Corn-Planter, and Hay-Rake Combined; and I do hereby declare the following to be an exact description thereof, reference being had to the accompanying drawings, and to the letters of reference marked thereon, making a part of this specification.

The nature of my invention consists in the construction of the several devices as movable and adjustable attachments to the main seeding frame, and their combination forming a grain-drill, corn-planter, and hay-rake, as hereinafter specified.

Figure 1 represents a top view of the machine.

Figure 2 shows a side view in a cross-section of the seed-planter.

Figure 3 shows likewise a cross-section of the rake.

Figure 4 shows the adjustable or movable bars, the shifting sections, with the hoes attached.

Figure 5 shows the devices or extension-axle for the purpose of widening the distance between the wheels, to answer the use of the rake.

Figure 6 exhibits the construction of the seeding-cylinder.

Figure 7 is a cross-section of the seeding-cylinder.

A represents the ordinary carriage wheels; B the square frame that supports the devices of the machine; C the driver's seat and lever to raise the rake; D the tongue or shafts for one or two horses; E the seeder commonly used for sowing clover or timothy seed; F the main hopper, to contain grain; and G the brush for keeping the grain broadcast as it passes from the hopper to the apron H beneath in a regular feeding operation from each aperture of the seeding-cylinder. J the rake piece to which the teeth are attached. This rake piece rests on its ends, in the forked frame K, when the hopper F, with its apron H, is removed. The forked frame or upright has a screw-bolt, L, at top, to hold the rake piece to its place, and the hoppers E and F being removed, the machine is ready for raking, the drag-bars M operating as the cleaners between the teeth of the rake, the drag-bars being jointed to rear attachments, N, fastened to the frame B; and when the machine is to be used for planting corn, the sliding rods P are shifted from the frame, by which six of the drag-bars are removed, and the sections Q, with six of the hoes, are also removed, the sections Q being movable, but held to the frame R by a clip at one end and swivel hook at the other end of the section or bar Q. The frame or cross-piece R is also movable, and fastened to the frame B by swivel hooks at the ends of the bar or cross-piece R. The cylinder is operated at one end and revolved by an ordinary cog-wheel and pinion on carriage-axle S, but its operating apertures, T, for seeding are regulated by a screw, U, on the opposite end that moves the inner slides V, to enlarge or diminish the apertures T, so as to sow the grain in the quantity required, and when used for planting corn the three round apertures W, one in the centre and one at each end of the cylinder, are used, and the seeding slides V are closed. The apron or feed-board H is a solid apron extending the whole length of the hopper F, and permanently hinged to the bottom of the hopper, so as to be easily removed with the hopper, the apron being funnel-shaped along its one side, so as to empty the grain into each spout and hoe. The axle X to each wheel is an independent axle, held to each end of the frame, and is attached to a cylinder, Y, by a spring-catch, Z, so that the axle can be adjusted by shifting through the cylinder, lengthening the axle so as to extend the wheels outward from the frame.

What I claim as my invention, and desire to secure by Letters Patent, is—

1. The manner of attaching the rake-piece J, and corn-planter devices P and Q to the grain-drill frame, as herein described.

2. I also claim the adjustable bar M, to which the hoes are attached, with the shifting sections Q, by which means the machine when used for planting corn or raking hay is clear or free of all unnecessary machinery.

3. I also claim the construction of the cylinder, with its devices U V T, so as to sow grain in different quantities, and plant one or more rows, as desired.

4. I also claim the adjustable feed-board or apron H, as combined with the hopper, by which the hopper F can be shifted without obstruction.

5. I also claim using the drag-bars in connection with their rear attachments N N as cleaners for the rake.

6. I also claim the construction of the shifting axles X X, with their devices Y Z, as arranged for the purpose of widening the drill-frame B the proper width for the rake.

7. I also claim the shifting rods P P, for the purpose of removing the extra drag-bars that should be dispensed with when the machine is operating as a rake or corn-planter.

8. I also claim the combination of the grain-drill, corn-planter, and hay-rake, so arranged as to be easily and quickly adjusted, as herein described, and for the purposes set forth.

ROBT. J. COLVIN.

Witnesses:
J. FRANKLIN REIGART,
JOHN S. HOLLINGSHEAD.